US008201219B2

(12) United States Patent
Jones

(10) Patent No.: US 8,201,219 B2
(45) Date of Patent: Jun. 12, 2012

(54) SYSTEMS AND METHODS FOR SERVER LOAD BALANCING USING AUTHENTICATION, AUTHORIZATION, AND ACCOUNTING PROTOCOLS

(75) Inventor: D. Mark Jones, Ontario (CA)

(73) Assignee: Bridgewater Systems Corp., Ottawa (CA)

( * ) Notice: Subject to any disclaimer, the term of this patent is extended or adjusted under 35 U.S.C. 154(b) by 973 days.

(21) Appl. No.: 11/860,353

(22) Filed: Sep. 24, 2007

(65) Prior Publication Data

US 2009/0083861 A1 Mar. 26, 2009

(51) Int. Cl.
*G06F 21/00* (2006.01)
(52) U.S. Cl. ............ 726/3; 726/2; 726/4; 726/5; 726/6; 726/26; 726/27; 726/28; 726/29; 726/30; 709/225; 709/226; 709/229; 713/182; 713/183; 713/184; 713/185
(58) Field of Classification Search .................. 709/229, 709/225–226; 726/2–8; 713/182–186
See application file for complete search history.

(56) References Cited

U.S. PATENT DOCUMENTS

| | | | | |
|---|---|---|---|---|
| 6,950,849 B1* | 9/2005 | Brandstatter | ................. | 709/203 |
| 7,088,718 B1* | 8/2006 | Srivastava | ..................... | 370/392 |
| 7,321,926 B1* | 1/2008 | Zhang et al. | ................... | 709/220 |
| 7,606,916 B1* | 10/2009 | Potter et al. | .................... | 709/229 |
| 2004/0230688 A1* | 11/2004 | Gbadegesin | ................... | 709/228 |
| 2005/0102400 A1* | 5/2005 | Nakahara et al. | ............. | 709/225 |
| 2007/0124476 A1* | 5/2007 | Oesterreicher et al. | ........ | 709/226 |
| 2009/0193428 A1* | 7/2009 | Dalberg et al. | ............... | 718/105 |
| 2010/0235507 A1* | 9/2010 | Szeto et al. | .................... | 709/225 |

OTHER PUBLICATIONS

Shakti et al. "A Cooperative Trust Management Framework for Load Balancing in Cluster Based Distributed Systems", May 6, 2010., 2010 International Conference on Recent Trends in Information, Telecommunication and Computing.*
P. Calhoun, Airespace, Inc., J. Loughney, Nokia et al., *Diameter Base Protocol*, Network Working Group (RFC3588), Sep. 2003, 1-147, The Internet Society.

* cited by examiner

*Primary Examiner* — Taghi Arani
*Assistant Examiner* — Josnel Jeudy
(74) *Attorney, Agent, or Firm* — Zilka-Kotab, PC

(57) ABSTRACT

Systems and methods for dynamically load-balancing clients across available servers without the need for a load balancer in front of a network are provided. Exemplary methods assign servers to clients in wireless and wireline networks based on server load. Methods and systems for using the authentication, authorization, and accounting (AAA) protocols to load-balance network servers are provided. The load-balancing systems and methods further include using the Diameter AAA protocol routing attribute value pairs (AVPs) to implement bootstrap functionality and load balancing. Methods and systems using the Diameter protocol to manage client assignments are disclosed. Methods and systems for dynamically load-balancing clients across available servers using an AAA protocol are further described. Methods and systems to redirect clients to available servers with the least load are disclosed.

22 Claims, 8 Drawing Sheets

SYSTEMS AND METHODS FOR SERVER LOAD BALANCING USING AUTHENTICATION, AUTHORIZATION, AND ACCOUNTING PROTOCOLS

BACKGROUND OF THE INVENTION

1. Field of the Invention

The present invention relates to communications, and more particularly, to authentication and authorization.

2. Background of the Invention

Authentication, Authorization, and Accounting (AAA) protocols such as Remote Authentication Dial-In User Service (RADIUS) and Diameter provide dial-up, point to point protocol (PPP), and terminal server access. As the Internet has grown and new network access technologies such as wireless, DSL, Mobile Internet Protocol (Mobile IP), and Ethernet have been introduced, network access servers (NAS) and routers have become increasingly complex. Increasing NAS complexity and density combined with large scale network deployments has placed new demands on AAA protocols such as RADIUS and other AAA protocols.

Future reference architectures such as 3rd Generation Partnership Project Systems Architecture Evolution (3GPP SAE) and other large scale reference architectures require thousands of NAS clients which in turn are assigned to access control servers such as Diameter servers. Managing the large numbers of client-server associations increases the cost and complexity of managing these network architectures. Additionally, the number of servers needed to support such large scale wireless and wireline networks also increases. Because protocols such as Diameter use a connection-based TCP protocol, a load balancer in front the Diameter servers only balances TCP connections. Accordingly, such a connection-based load balancing algorithm may lead to overload since differences between independent client capacities and loads are not considered (i.e. an urban client node may generate many times the load of a rural node but would be treated equally by the load balancer). Similarly, a high-capacity server that has a relatively high number of existing TCP connections may be better-able to handle additional connections than other lower-capacity servers that have a relatively low number of TCP connections. Improved load balancing methods and systems are needed that do not merely balance connections and take client and server capacities into account when assigning clients to servers.

Current load balancers for access control servers generally consist of dedicated computer hardware or machines for load balancing in front of the access control servers. As Diameter uses TCP with relatively long-lived connections, dedicated load balancer computers or machines in front of Diameter servers are limited to balancing TCP connections between servers and clients. Thus, most load balancing solutions for Diameter servers can currently only balance server loads on a per-connection basis. This is in contrast to load balancers for RADIUS servers because RADIUS uses UDP and not TCP. UDP-based network architectures such as RADIUS can be load-balanced on a per-request basis whereby messages and not connections are load balanced across available RADIUS servers. Load balancers for RADIUS servers are generally dedicated computers in front of RADIUS servers and do not take server capacity into account when assigning clients to servers. Load balancers for RADIUS servers also do not dynamically re-assign clients based upon changes to server load over time.

As large scale networks with thousands of clients and access control servers are deployed, the inherent limitations of connection-based load balancers will be compounded. Even 'smart' load balancers that probe or query server load based upon servers' current central processing unit (CPU) utilization, input output (I/O) throughput, memory utilization, et al cannot optimally balance server loads. This is because servers typically use off-node resources such as databases which may make server nodes appear to be 'idle' when they are actually operating at or near capacity.

What is needed are cost effective systems and methods to manage client-server assignments in wireless and wireline communications networks.

What is further needed is a cost effective and scalable server load balancing in large-scale server systems over time.

SUMMARY OF THE INVENTION

The present invention provides systems and methods for dynamically load-balancing clients across available servers. In accordance with one aspect of the invention, a method may perform load balancing while eliminating the need for a dedicated load balancer in front of a plurality of servers. The present invention also eliminates the need for dedicated bootstrap server hardware by providing bootstrap functions within an access control server that is available to be assigned to network access server clients. In accordance with one aspect of the invention, a system may use Diameter base protocol routing and redirect attribute value pairs (AVPs) to implement a bootstrap function and manage client assignments. In accordance with one aspect of the invention, a method may perform load-balancing by assigning clients to servers based on server load. In accordance with another aspect of the invention, a method may perform load-balancing by assigning clients to a least-loaded, available server where load is measured based on server capacity at the time of client assignment. Server load is measured based on capacity metrics such as memory utilization measured as a percentage of available physical memory versus allocated memory, central processing unit (CPU) utilization, disk activity, storage media utilization, input/output (I/O) throughput, pending off-node transactions, and the size of internal server message queues. In an embodiment of the invention, server load is reported by servers in terms of application load in combination with machine capacity metrics that are either reported by servers or observable by external machines and software programs. In another embodiment of the invention, a system may include a caching function to store client assignments for subsequent reference.

In accordance with one aspect of the invention, a method may exploit user-defined and base protocol Diameter AVPs to dynamically load-balance clients across available servers. In one embodiment of the invention, a method is provided to dynamically load-balance servers by periodically requesting or polling servers for current load and client assignment information and using that information to re-assign clients from heavily-loaded servers to least-loaded servers. Dynamic load balancing is optionally achieved by servers performing bootstrap functions receiving unsolicited, periodic load and client assignment information updates from servers and using that information to re-assign clients from heavily-loaded servers to less-loaded servers.

In accordance with one embodiment of the invention, a system may include servers that send load and assigned client information to bootstrap servers at regular intervals via Diameter base protocol AVPs and user-defined AVPs. This embodiment eliminates the need for bootstrap servers to request load and client assignment information from every target server on initial client startup.

Further embodiments, features, and advantages of the invention, as well as the structure and operation of the various embodiments of the invention are described in detail below with reference to accompanying drawings.

BRIEF DESCRIPTION OF THE FIGURES

The present invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

1.0 Structural Embodiments

Embodiments of the present invention are described primarily in the context of a Diameter server system (e.g., a server farm) used in GSM, CDMA, TDMA, 3GPP2, and WiMAX, and Wi-Fi networks. It should, however, be understood that the invention is not limited to wireless communications networks. The present invention may be used in fixed line, DSL, converged, and other wireline, fixed, or mixed communication networks, as would be recognized by persons of skill in the art.

Embodiments of the present invention exploit base Diameter AVPs related to routing and redirect features of the Diameter protocol to implement a method of load balancing. The load balancing method described herein assigns clients to servers based upon server's self-reported load so that clients are assigned to the least-loaded servers upon client startup. The client-server assignments are performed as part of the bootstrapping function to ensure that Diameter clients are assigned to servers in an efficient cost-effective manner as clients are added to, or discovered by, a communication network.

Figure 1:
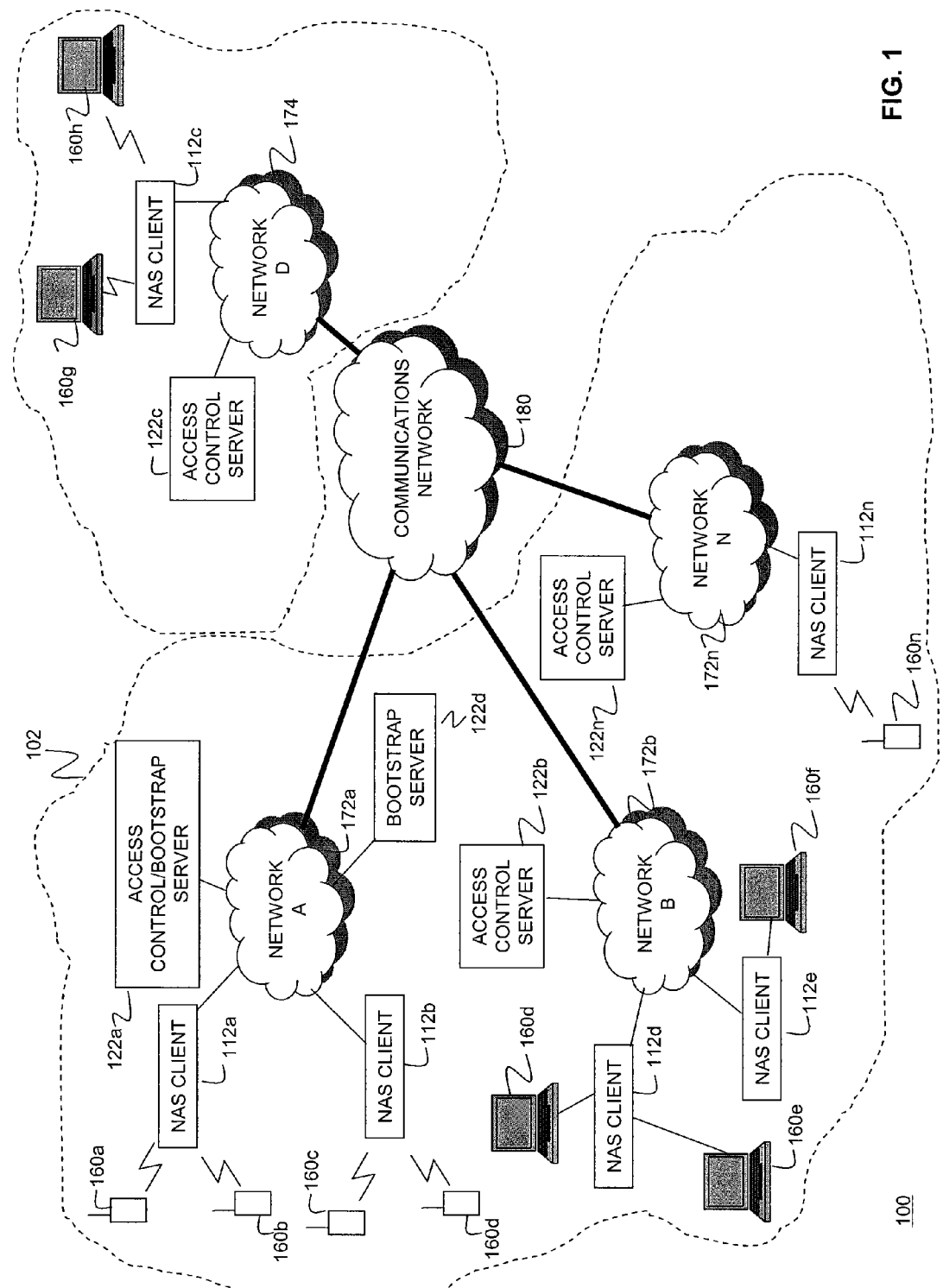
FIG. 1 provides a block diagram of the Load Balancing System.

FIG. 1 provides a block diagram of an exemplary operating environment 100 for a Load Balancing system, according to embodiments of the present invention.

Exemplary operating environment 100 includes a first service provider infrastructure 102, a second service provider infrastructure 104, and an optional communications network 180. Although two service provider infrastructures are depicted, operating environment 100 may include any number of service provider infrastructures.

Exemplary service provider infrastructure 102 includes one or more networks 172a-n. Network 172 may be any type of public or private communication network including, but not limited to, a wireline network, a wireless telecommunication and/or data network (e.g., TDMA, CDMA, GSM, Wi-Fi, or WiMax networks). Each network 172 includes one or more NAS clients 112a-n, and one or more access control servers 122a-n. An access control server 122 may also include bootstrap server functionality. These servers are referred to herein as "bootstrap servers" or "access control/bootstrap servers." In addition or alternatively, multiple networks may share a NAS client 112a, an access control/bootstrap server 122a, a bootstrap server 122d, and/or an access control server 122b.

Devices 160a-d and device 160n in the first service provider infrastructure 102 access network 172 via a wireless communication protocol. Devices 162e-f in the first service provider infrastructure 102 access network 172 via a wired communication protocol. When a device 160 attempts access to a network, the device 160 is connected to a NAS client 112 which facilitates authentication of the user and/or user device. After the device is successfully authenticated, the device 160 may access an application or other network resource via network 172.

Devices 160a-n may be any type of wired or wireless communication devices including, but not limited to, a wireless phone, a personal digital assistant (PDA), a mobile computer, a laptop, a computer, a wireline telephone, a television, or any similar device with communication capability. Devices 160a-n are configured to access one or more networks 172 in their home service provider infrastructure (e.g., service provider infrastructure). In addition, devices 160a-n may be configured to access one or more networks in a third party service provider infrastructure (commonly referred to as "roaming"). Devices 160a-n may also include software and/or hardware for accessing applications deployed in their home service provider infrastructure and/or a third party service provider infrastructure.

A NAS client 112 is configured to receive requests from users for access to a network and to interact with users via user devices to obtain additional information that may be necessary to authenticate the user and/or user device to the network (e.g., password). For example, user devices 160a and 160b request access to network 172a from NAS client 112a. NAS client 112 is further configured to generate an access request message and to transmit the access request message to the access control server 122 supporting the network. The format of the access request message is dependent upon the protocol being used for authentication and authorization of a user. Examples of authentication and authorization protocols include dynamic host configuration protocol (DHCP), remote authentication dial in user service (RADIUS), Diameter, and terminal access controller access control system (TACACS). For access control and authentication services, NAS client 112 acts as a client of access control server 122.

A network access server (NAS) client contacts a server that is designated to perform bootstrap functionality when the client is added to the network, discovered by the network, starts up for the first time, restarts, or reboots. Traditionally, the bootstrap functionality is performed by a dedicated bootstrap server. Bootstrap functionality includes assigning a starting NAS client to a server.

Access control server 122 is configured to receive access request messages from a NAS client 112 and to forward the access request messages to the appropriate bootstrap server 122a. Access control server 122 also includes logic for performing authentication and/or access control processing. Access control server 122 may support any type of user access control and/or authentication. A single access control server 122 may support multiple NAS clients 112.

Access control server/bootstrap server 122a is configured to perform bootstrap functions in addition to performing access control server functions. Access control server/bootstrap server 122a is therefore available for client assignments.

Bootstrap server 122d is a dedicated bootstrap server.

Integrated bootstrap server 122a and dedicated bootstrap server 122d in embodiments of the present invention are peers with the other servers in service provider network 102 and likewise report their own server load and any cached client assignments.

2.0 Methods 2.1 Diameter Overview

Diameter is also an AAA protocol that has advantages in the areas of reliability, scalability, and security over RADIUS. While Diameter is not directly backwards compatible with RADIUS, it provides transition support for and an upgrade path from RADIUS.

Diameter is a framework for applications such as network access or Internet Protocol (IP) mobility. Diameter can be deployed in both local and roaming AAA scenarios. Diameter uses reliable, connection-based transport protocols such as the Transmission Control Protocol (TCP) and not the User Datagram Protocol (UDP) employed by RADIUS. Diameter uses a larger address space for Attribute Value Pairs (AVPs) and identifiers than RADIUS (32-bits in Diameter instead of 8-bits in RADIUS). Diameter AVPs are used to encapsulate protocol-specific data such as redirect and routing information in addition to AAA information. While Diameter is a client-server protocol, it supports some server-initiated messages as well. Diameter also allows servers to dynamically discover peer servers (e.g., other servers in the same network).

A Diameter client is a device at the edge of a Diameter network that performs network access control. An example of a Diameter client is a network access server (NAS). An example of a Diameter server is an access control server that handles AAA requests for a particular realm. A Diameter Server supports Diameter applications with extensions to the Diameter protocol in addition to the base Diameter protocol.

A Diameter AVP is comprised of a header and variable length payload. The AVP header contains flags and codes such as the attribute name which uniquely identifies the attribute and provides the AVP length in bytes. The AVP payload includes an attribute value which can be a variety of data formats. A Diameter server uses a data dictionary to look up the AVP based on the attribute name indicated in the header and determine how to decode the attribute value within the payload.

A Diameter command consists of a header and a variable length payload. The command header contains a flags and codes which serve to uniquely identify the command as well as the command length in bytes. The command payload is one or more Diameter AVPs.

A Diameter application is a protocol based on Diameter. Diameter applications can extend the base Diameter protocol by adding new commands and attributes. In addition to using the basic AVP data formats, Diameter applications may also define data formats derived from basic AVP data formats. A Diameter application that defines new AVP derived data formats must include them in a section entitled "AVP Derived Data Formats," and each new definition must be either defined or listed with a reference to the RFC that defines the format.

Diameter is more extensible than RADIUS, as new commands and attributes can be defined in user-defined AVPs. The Diameter protocol's extensibility is achieved through addition of new commands included in user-defined AVPs. The Diameter protocol can be extended by the creation of new applications, commands, AVPs or AVP values. New user-defined Diameter AVPs can be created and used in conjunction with the pre-defined, base protocol AVPs. Any new AVPs being defined can used derived data formats or one of the following data formats: Float32, single-precision floating point value; Float64, a double-precision floating point value; Grouped, a sequence of AVPs; Integer32, a 32-bit signed value; Integer64, a 64-bit signed value; or Octet String, arbitrary data of variable length of at least 8 bits.

Figure 2:
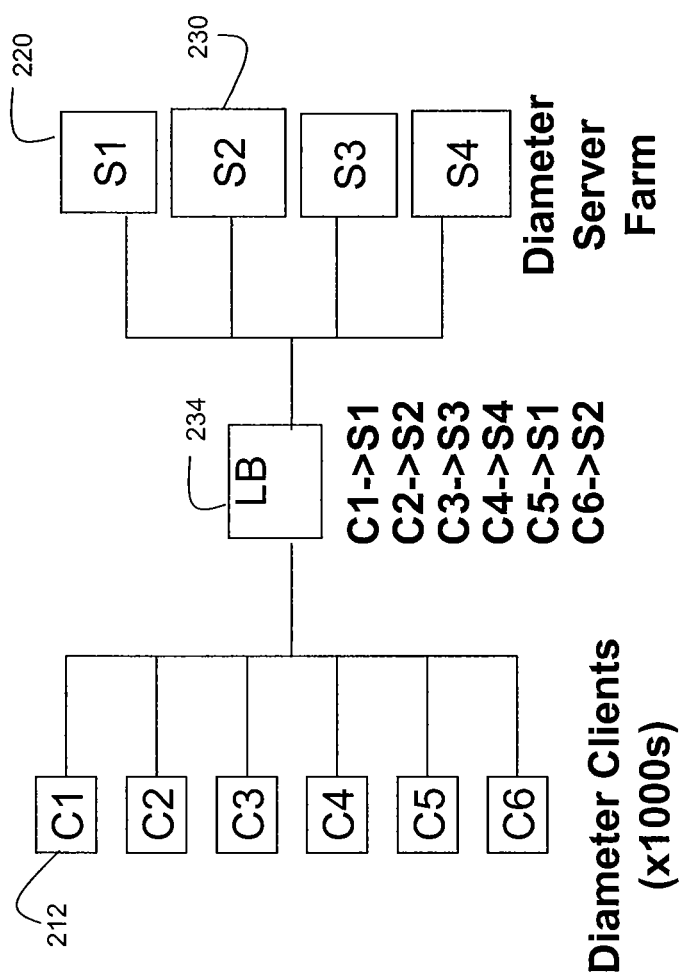
FIG. 2 provides a diagram of TCP connection-based Load balancing.

As described above, load balancing for certain AAA protocols such as Diameter is connection-based. FIG. 2 provides a diagram of TCP connection-based Load balancing 200. While connection-based load balancing is known in the art, there are limitations associated with performing client-server assignments based solely on TCP connections. Without knowledge of server load, server balancing based on TCP connections can lead to under-utilized (S1, 220) or overloaded (S2, 230) servers. There are also limitations associated with 'smart' load balancing that is based on traditional measurements of server load. FIG. 2 depicts how load balancers such as LB 234 that probe server load do not result in optimal load balancing when servers such as S2, 230 are using off-node resources such as databases. As is known in the art, server load for servers such as S2 230 is based on machine load factors such as the server's current CPU utilization, memory utilization, input/output throughput, and other server resource usage measurements that are observable by external machines or software programs. Server load for S2 230 does not take into account pending off-node resources such as database queries that have been submitted to database servers, but not yet processed. Use of off-node resources can make servers appear to be idle while actually operating at or near capacity (i.e., when pending off-node transactions or queued messages are processed). Server load for S2 230 also does not take into account application load factors such as the size of its internal message queues. Thus, there are limitations for load balancers such as LB 234 even when they probe server load because LB 234 will still assign clients such as C1 212 to overloaded servers such as S2 230 because LB 234 does not take into account pending off-node transactions or the size of internal message queues for S2 230.

2.2 Method for Client-Server Assignments

Figure 3:
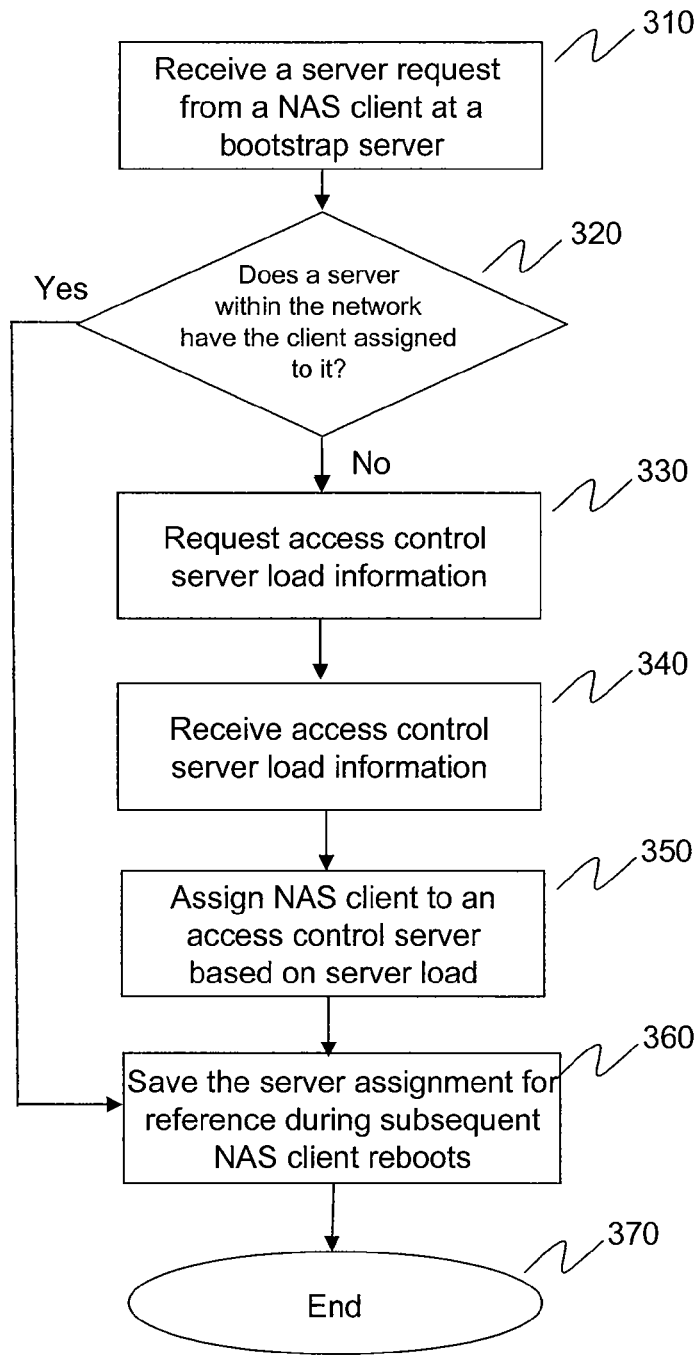
FIG. 3 provides a flowchart of the client-server assignment process, according to an embodiment of the invention.

FIG. 3 provides a flowchart 300 of a method of client-server assignment, according to an embodiment of the invention. Flowchart 300 is described with reference to the embodiments of FIG. 1. However, flowchart 300 is not limited to those embodiments. Note that the steps in the flowchart do not necessarily have to occur in the order shown.

In step 310, a bootstrap server 122a, 122d receives a server assignment request from a NAS client 112.

In step 320, the bootstrap server 122a, 122d determines if any servers currently have the NAS client assigned to them. If the client is already assigned to a server, operation proceeds to step 360, otherwise, the bootstrap server requests server load information from each access control server in step 330.

In step 340, the bootstrap server receives load information from each access control server serving the network.

In step 350, the bootstrap server assigns the client to a server based on the server load reported in step 340. For example, bootstrap server 122a, 122d may assign the NAS client 112 to the least-loaded server.

In step 360, the server assignment for the client is stored or cached at bootstrap server 122a, 122d. The access control server assignment information is provided to bootstrap server 122a, 122d within Diameter base protocol routing and redirect AVPs.

Figure 4:
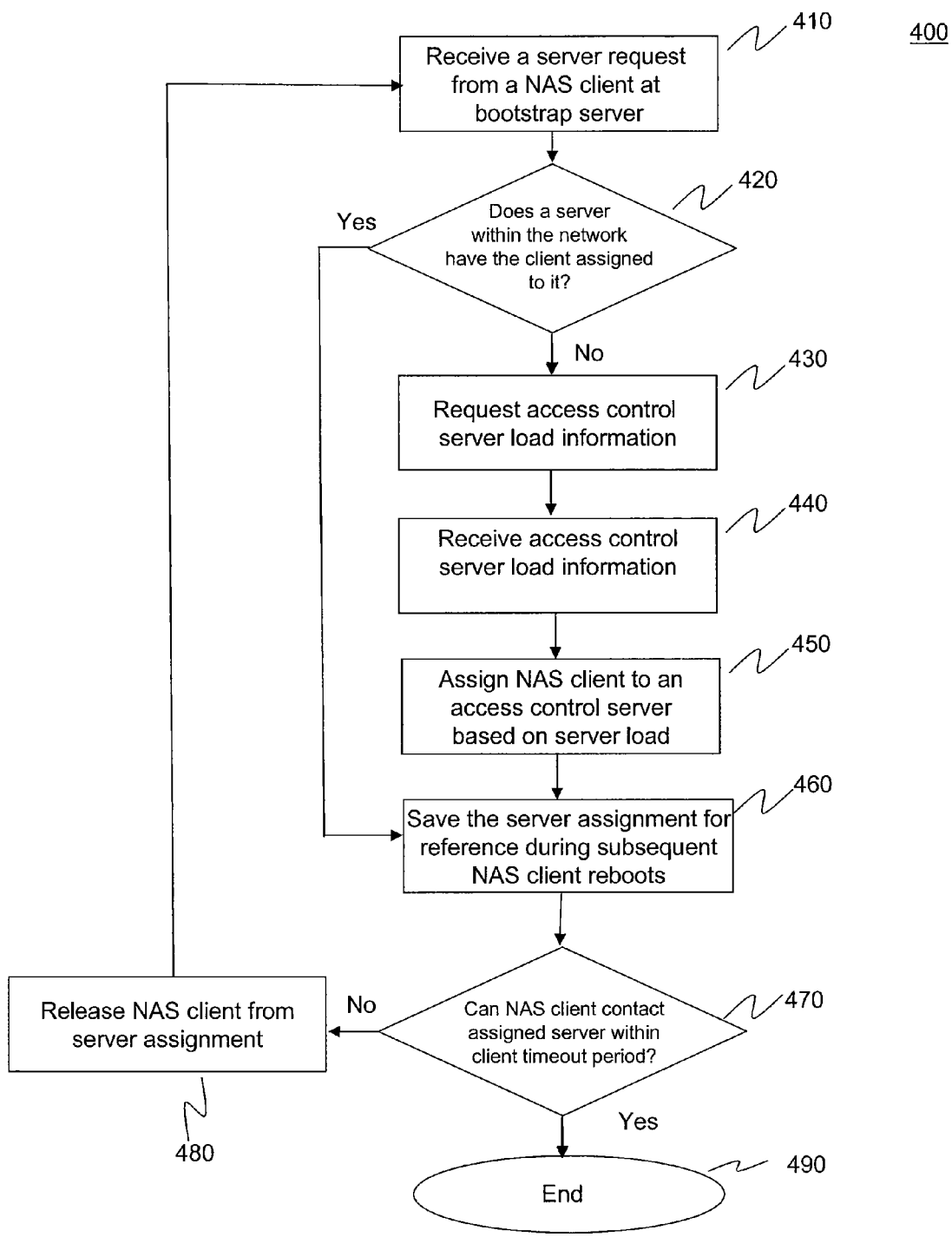
FIG. 4 provides a flowchart of the client-server assignment process in a split network scenario, according to an embodiment of the invention.

FIG. 4 provides a flowchart 400 of a method of client-server assignment and re-assignment when the assigned server becomes unreachable from the client 400, according to an embodiment of the invention. Flowchart 400 is described with reference to the embodiments of FIG. 1. However, flowchart 400 is not limited to those embodiments. Note that the steps in the flowchart do not necessarily have to occur in the order shown.

In step 410, a bootstrap server 122a, 122d receives a server assignment request from a NAS client 112.

In step 420, the bootstrap server 122a, 122d determines if any access control servers currently have the NAS client 112 assigned to them. If the NAS client 112 is already assigned to an access control server, proceed to step 460, otherwise, the bootstrap server 122a, 122d requests server load information from each access control server 122 in step 430.

In step 440, the bootstrap server 122a, 122d receives load information from each access control server 122.

In step 450, the bootstrap server 122a, 122d assigns the NAS client 112 to an access control server 122 based on the server load reported in step 440. For example, bootstrap server 122a, 122d may assign the NAS client 112 to the least-loaded server.

In step 460, the server assignment for the client is stored or cached by the bootstrap server for reference during subsequent client reboots. For example, the assignment may be communicated to the bootstrap server in Diameter Attribute Value Pairs (AVPs) and stored at the bootstrap server. In accordance with an embodiment of the invention, the server assignments for clients may be stored at the bootstrap server in a client-to-server assignment map or table. In accordance with an embodiment of the invention, setting the Result-Code attribute to the REDIRECT_NOTIFICATION value indicates to NAS client 112 that future commands should be sent to a different access control server. In accordance with an embodiment of the invention, Diameter redirect AVPs are used to inform NAS client 112 of the target of the redirect (e.g., the assigned access control server 122), the scope of the redirect, and the duration of the redirect.

In accordance with an embodiment of the invention, the scope of the redirect is specified by setting the Redirect-Host-Usage attribute to the ALL_HOST value, the assigned target server, access control server 122, is specified by setting the Redirect-Host attribute to the IP address of target access control server 122, and the Redirect-Max-Cache-Time attribute is set to the duration of the redirect in seconds.

In step 470, if the NAS client 112 is able to contact the assigned server within the client's predetermined timeout period, the operation ends with step 490. If the NAS client 112 is unable to contact the assigned access control server 122 within the client's timeout period, the bootstrap server 122a, 122d releases the NAS client 112 from the current server assignment in step 480 and steps 410-360 are repeated.

Figure 5:
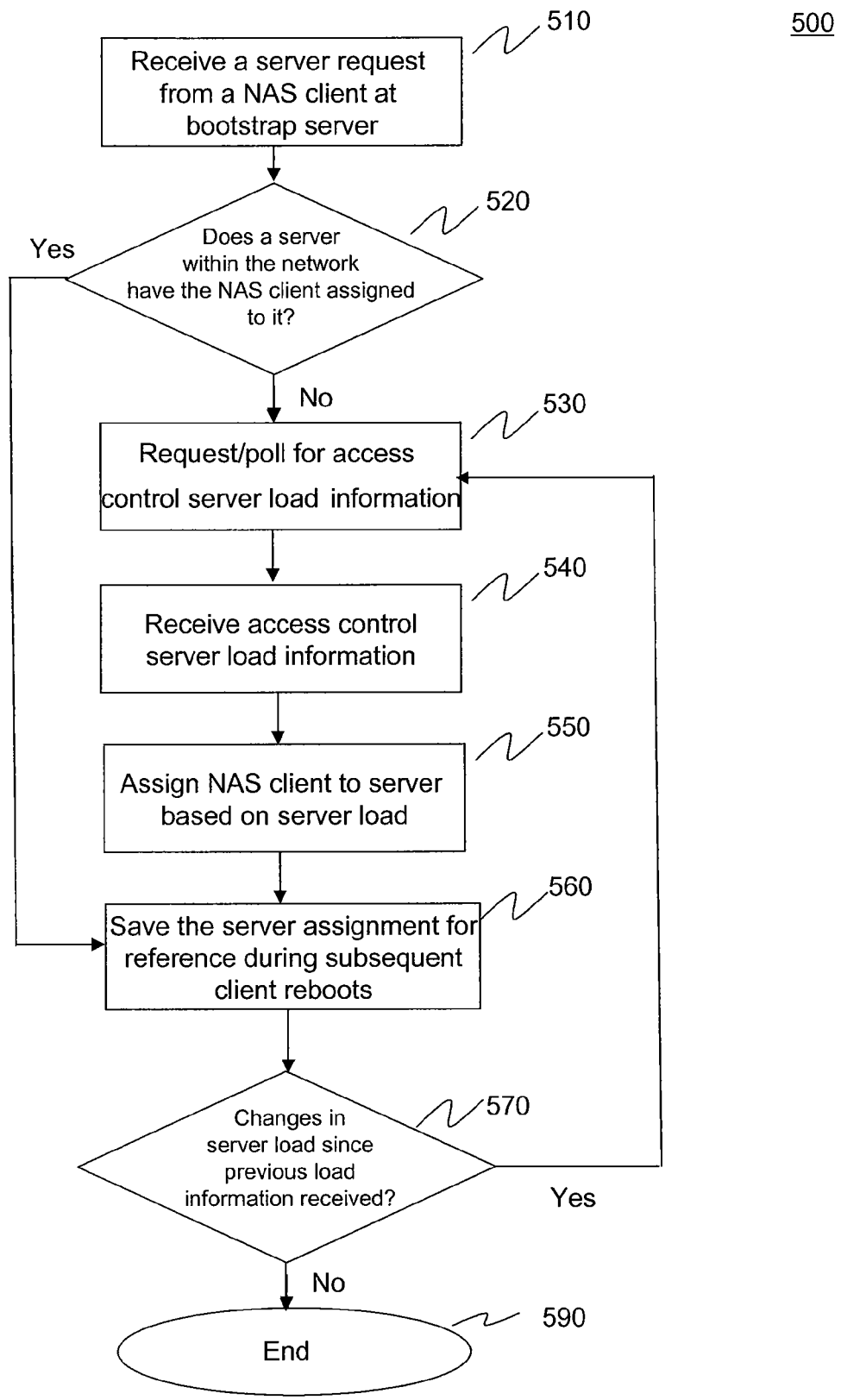
FIG. 5 provides a flowchart of the client-server assignment process including polling for server load information, according to an embodiment of the invention.

FIG. 5 provides a flowchart of client-server assignment including polling server load information 500, according to an embodiment of the invention.

In step 510, a bootstrap server receives a server assignment request from a client.

In step 520, the bootstrap server determines if any servers currently have the client assigned to them. If the client is already assigned to a server, proceed to step 560, otherwise, the bootstrap server requests server load information from each server in step 530.

In step 540, the bootstrap server receives load information from each access control server.

In step 550, the bootstrap server assigns the client to a server based on the server load reported in step 540, according to an embodiment of the invention. According to another embodiment of the invention, in step 550, the bootstrap server assigns the client to the least-loaded server.

In step 560, the server assignment for the client is stored or cached by the bootstrap server for reference during subsequent client reboots.

In step 570, if server load has not changed since the previous request for load information in step 530, the process ends with step 590. If server load has changed since the previous request for load information in step 530, the bootstrap server polls for server load information again and steps 530-470 are repeated.

2.3 Initial Client Boot and Client-Server Assignment

Figure 6:
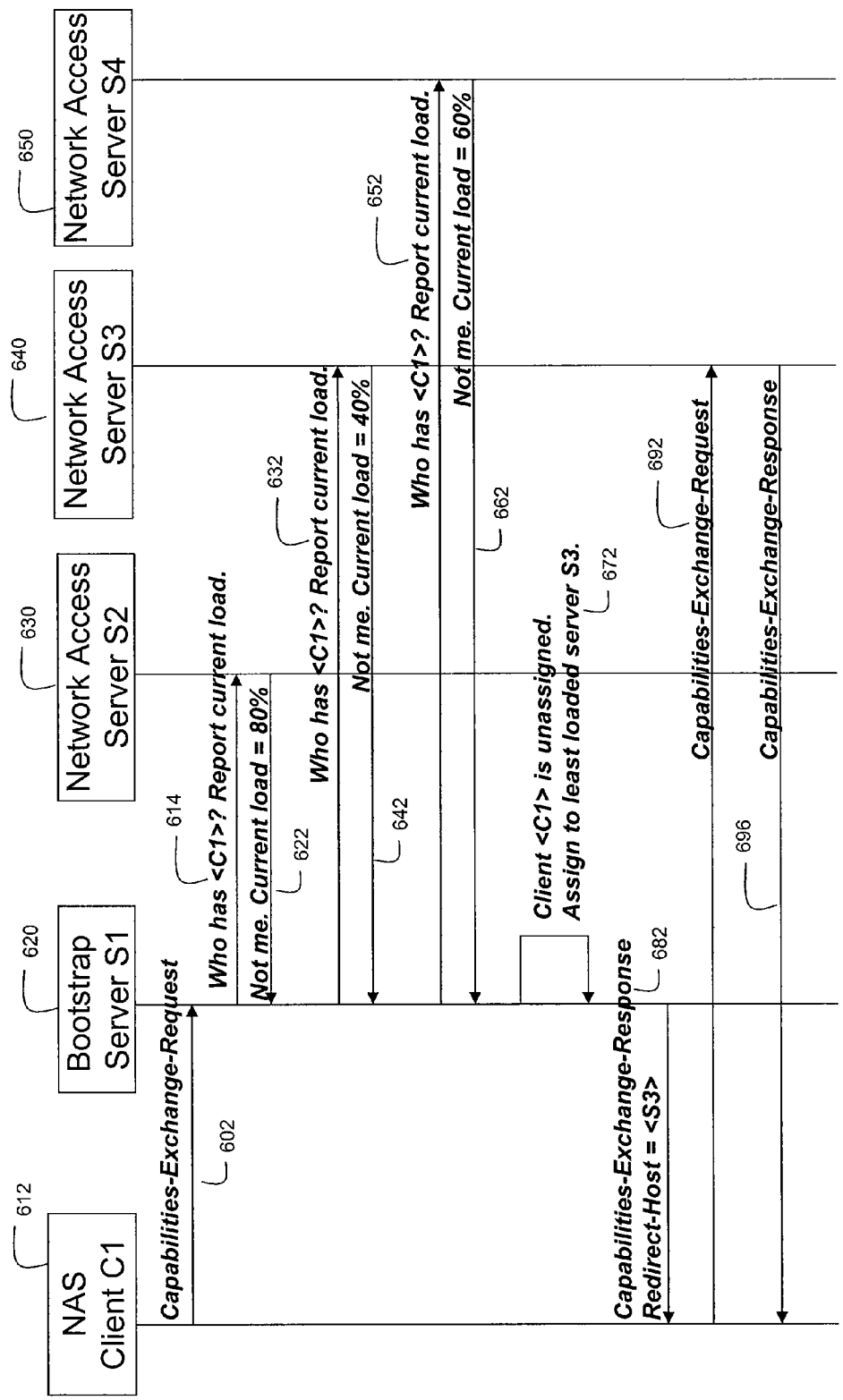
FIG. 6 provides a message sequence chart (MSC) of an Initial client boot and depicts the client-server assignment process, according to an embodiment of the invention.

FIG. 6 provides a message sequence chart (MSC) of an Initial client boot and server assignment 600 according to an embodiment of the present invention. The initial client boot and client-server assignment includes the steps described below and depicted in FIG. 6.

In step 602, when booting up for the first time, client C1 612 sends a server assignment request to bootstrap server S1 620. For example, the server assignment request may be included in a Diameter Capabilities-Exchange-Request message.

In step 614, bootstrap server S1 620 broadcasts messages to peer servers such as S2 630 to determine if C1 612 is currently assigned to any servers. S1 620 sends a message to S2 630 to determine if C1 612 is currently assigned to S2 630 and to get a report of current load from S2 630.

In step 622, server S2 630 responds to S1 620 indicating whether the identified client is assigned to S2 630 and the current load of server S2 630. For example, the S2 630 response may include data indicating that C1 612 is not assigned to S2 630 and that S2 630 has a current load of 80%. In this step server S2 630 will report its own current capacity and load information as measured by its application load and its machine capacity. Server load for S2 630 may include one or more of one or more of CPU utilization, memory allocation, pending off-node transactions, storage usage, disk activity, and the size of internal message queues.

In step 632, bootstrap server S1 620 proceeds to send a message to peer server S3 640 to determine if C1 612 is currently assigned to S3 640 and to get a report of current server load from S3 640.

In step 642, server S3 640 responds to S1 620 indicating whether the identified client is assigned to S3 640 and the current load of server S3 640. For example, the S3 response 642 may include data indicating that client C1 612 is not assigned to S3 640 and that S3 640 has a current load of 60%. In this step server S3 640 will report its own current capacity and load information as measured by its application load and its machine capacity. Server load for S3 640 may include one or more of one or more of CPU utilization, memory allocation, pending off-node transactions, storage usage, disk activity, and the size of internal message queues.

In step 652, bootstrap server S1 620 sends a message to peer server S4 650 to determine if C1 612 is currently assigned to S4 650 and to get a report of current load from S4 650.

In step 662, server S4 650 responds to S1 620 indicating whether the identified client is assigned to S4 650 and the current load of server S4 650. For example, the S4 response 662 may include data indicating that client C1 612 is not assigned to S4 and that S4 has a current load of 60%. In this step server S4 650 will report its own current capacity and load information as measured by its application load and its machine capacity. Server load for S4 650 may include one or more of one or more of CPU utilization, memory allocation, pending off-node transactions, storage usage, disk activity, and the size of internal message queues.

In step 672, bootstrap server S1 620 determines the assignment for client C1 612 based on assignment logic. For example, client C1 612 may be assigned to server S3 640 based on S3's load since S3 640 reported operating at 60% of capacity in this specific example. In this example, the least-loaded server, S3 640 is selected, but alternative embodiments may allow for additional selection criterion to be used in making server assignments.

In step 682, bootstrap server sends the S3 630 server assignment information to client C1 612. For example, this information may be included within a Diameter Capabilities-Exchange-Response. The server assignment information in step 682 is stored at the bootstrap server. For example, the assignment information may be communicated to the bootstrap server via the Redirect-Host base Diameter protocol AVP and subsequently stored at the bootstrap server.

In step 692, after the assignment is made, client C1 612 sends a server assignment confirmation request. For example, this information may be included within a Diameter Capabilities-Exchange-Request to server S3 640.

In step 696, server S3 640 sends an acknowledgment to client C1 612. For example, this information may be included within a Diameter Capabilities-Exchange-Response.

2.4 Client-Server Reassignment After Initial Client-Server Assignment

Figure 7:
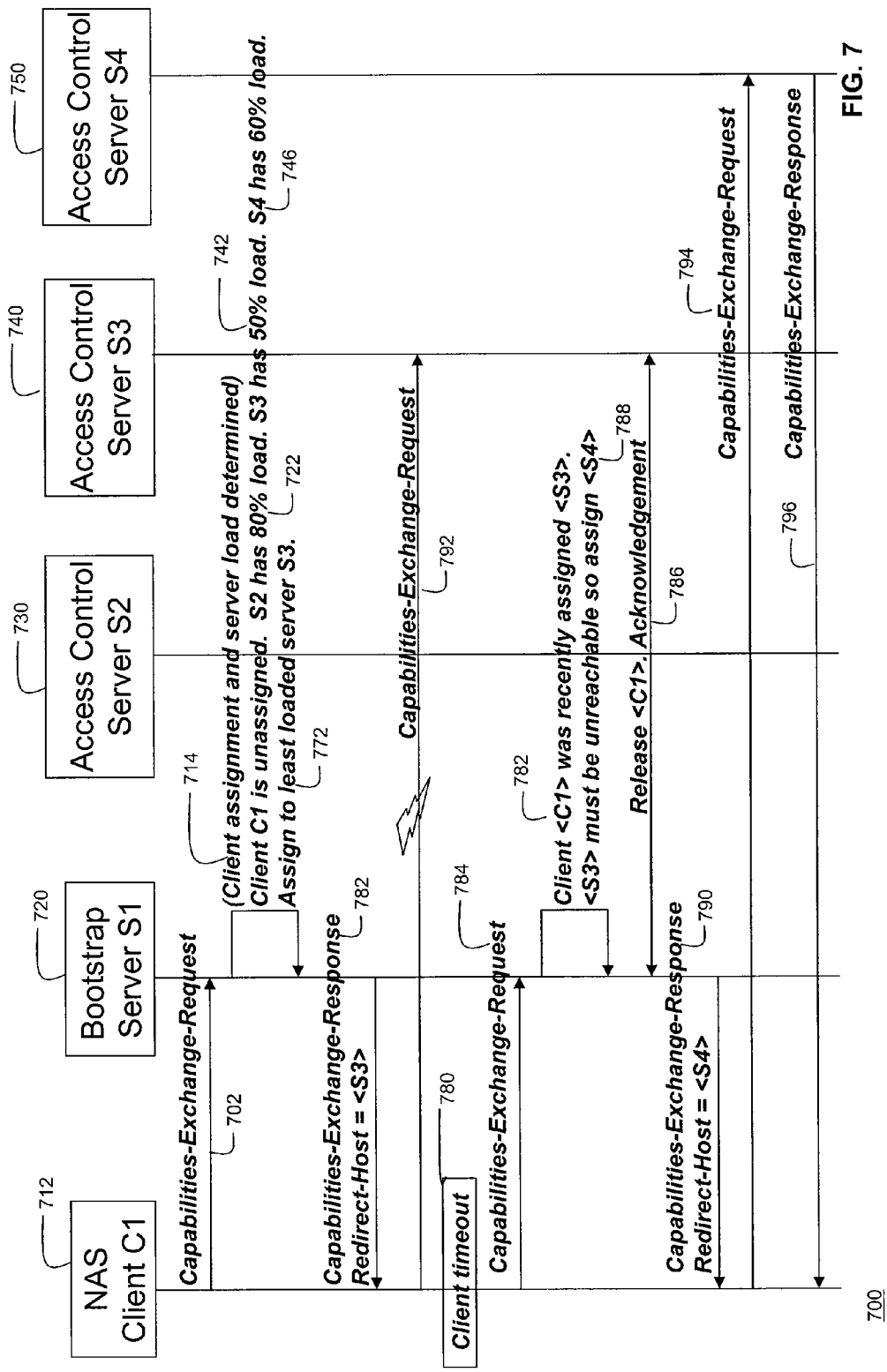
FIG. 7 provides a Message Sequence Chart (MSC) of the Split Network Solution, according to an embodiment of the invention.

FIG. 7 provides a Message Sequence Chart (MSC) of client-server reassignment 700 after an initial assignment to an access control server, according to an embodiment of the invention. FIG. 7 depicts an embodiment of the invention that comprises additional steps beyond the initial client boot and client-server assignment embodiment depicted in FIG. 6. The subsequent reassignment depicted in FIG. 7 complements the initial client boot and client-server assignment depicted in FIG. 6.

In step 702, when booting up, client C1 712 sends a server request to bootstrap server S1 720. For example, this information may be included within a Diameter Capabilities-Exchange-Request.

In step 714, bootstrap server S1 720 broadcasts messages to peer servers such as S2 730, S3 740, and S4 750 to determine if C1 712 is currently assigned to any of the servers and to get a report of current load from each server.

In step 714, servers S2 730, S3 740, and S4 750 each respond to bootstrap server S1 720 indicating that C1 712 is not assigned to any of the servers. In this step, the servers also report their own current capacity and load information as measured by their respective application machine loads. Server load for servers S2 730, S3 740, and S4 750 may include one or more of one or more of CPU utilization, memory allocation, pending off-node transactions, storage usage, disk activity, and the size of internal message queues.

For example, S3 740 reports in step 742 that it has a current load of 50%, S4 750 reports its current load of 60% in step 746, and S2 reports its current load as 80% in step 722.

In step 772, bootstrap server S1 720 determines the assignment for client C1 712 based on assignment logic. For example, client C1 712 may be assigned to server S3 740 based on S3's load since S3 740 reported operating at 50% of capacity in step 742 in this specific example. In this example, the least-loaded server, S3 740 is selected, but alternative embodiments may allow for additional selection criterion to be used in making server assignments.

In step 782, bootstrap server S1 720 sends server assignment information to client C1 712. For example, this information may be included within a Diameter Capabilities-Exchange-Response. The server assignment for the client is stored at the bootstrap server S1 720. For example, server assignment for the client may be communicated to bootstrap server S1 720 in the value for the Redirect-Host attribute and subsequently stored at bootstrap server. In accordance with an embodiment of the invention, bootstrap server S1 720 may use the Redirect-Host attribute values to build a client-to-server map from the client's IP address to the redirect host's IP address. In this example, bootstrap server S1 720 builds a map from the IP address of client C1 712 to the IP address of S3 740.

In step 784, after the assignment is made, client C1 712 sends a Capabilities-Exchange-Request to the assigned access control server to confirm the assignment by the bootstrap server.

In step 782, client C1 712 does not receive a response within a predetermined time period. Client C1 712 does not receive a response from server S3 740 either because S3 740 does not send a Capabilities-Exchange-Response back to client C1 712 within the client timeout period for client C1 712 or because S3 740 did not receive the Capabilities-Exchange-Request from C1 in step 782.

In step 788, client C1 712 sends a subsequent Capabilities-Exchange-Request to bootstrap server S1 720 because assigned server S3 740 is now unreachable (i.e., S3 740 is split from client C1's 712's portion of the network).

In step 786, bootstrap server S1 720 sends a message to S3 740 to release the previous C1 712-S3 740 assignment.

In step 786, bootstrap server S1 720 sends server S3 740 a message releasing the assignment of client C1 712 and server S3 740 acknowledges the release of the assignment. The release of the assignment is done to avoid server S3 740 claiming client C1 712 on a subsequent reboot of client C1 712.

In step 790, bootstrap server S1 720 determines a subsequent assignment for client C1 712. For example, bootstrap server S1 may assign client C1 712 to the next least-loaded server S4 750.

In step 790, bootstrap server S1 720 sends server assignment information to client C1 712. For example, this information may be included within a Diameter Capabilities-Exchange-Response.

The server assignment for the client is stored at bootstrap server S1 720. For example, a new server assignment for the client may overwrite the previous assignment stored in the client-to-server map when a new Redirect-Host attribute payload value is communicated to the bootstrap server in step 790 above. In this example, bootstrap server S1 720 updates its client-to-server map with the new Redirect-Host value indicating the IP address of server S4 750.

In step 794 after the re-assignment is made, client C1 712 sends a message to server S4 750 to confirm the assignment. For example, this information may be included within a Diameter Capabilities-Exchange-Response.

In step 796, server S4 750 sends an assignment acknowledgment back to client C1 712 within the client timeout period. For example, this information may be included within a Diameter Capabilities-Exchange-Response.

3.0 Client-Server Computer System Implementation

Figure 8:
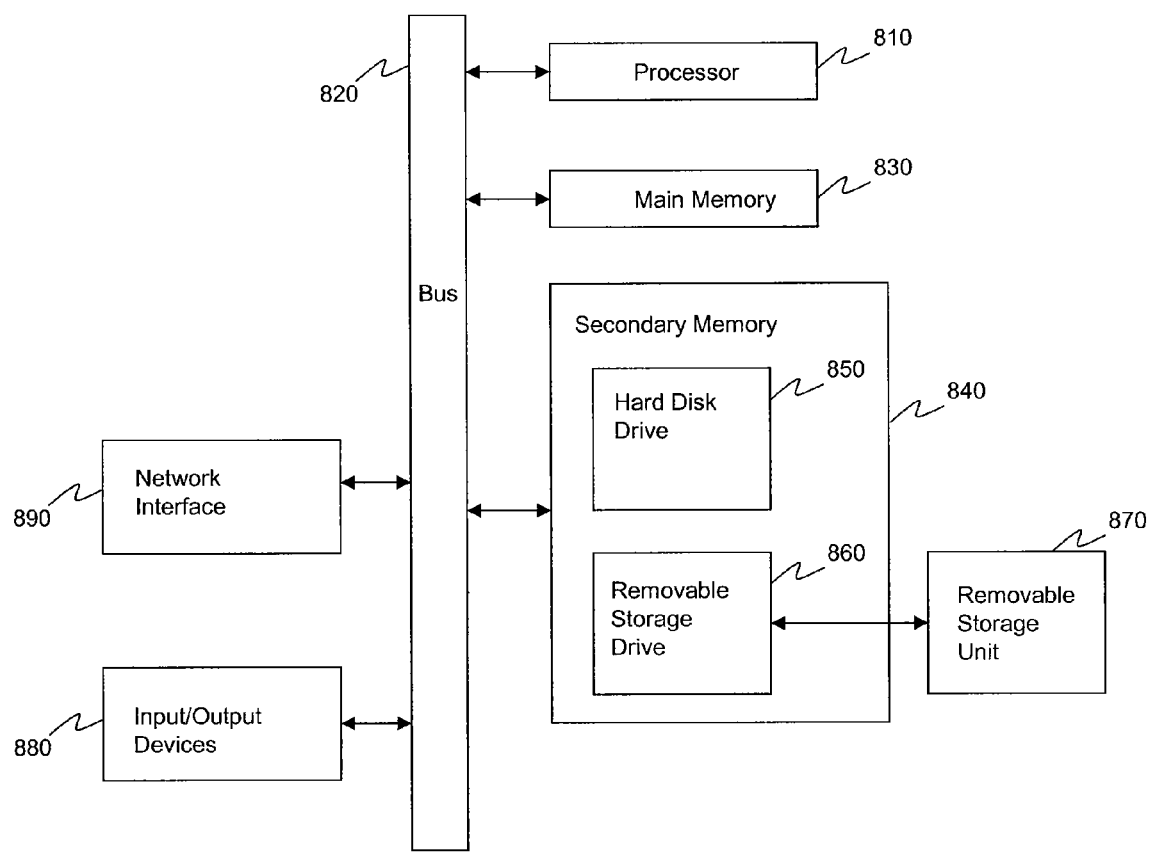
FIG. 8 is a diagram of a computer system on which the methods and systems herein described can be implemented, according to an embodiment of the invention.

FIG. 8 provides a diagram of a computer used to implement the Diameter bootstrap and load balancing computer program product, according to an embodiment of the invention.

Embodiments of the present invention can be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices.

In an embodiment of the present invention, the methods and systems of the invention described herein are implemented using well known computers, such as a computer 800 shown in FIG. 8. The computer 800 can be any commercially available and well known computer or server capable of performing the functions of clients, bootstrap servers, and servers described herein, such as servers available from International Business Machines, Sun Microsystems, Hewlett Packard/Compaq, Dell, Cray etc.

Computer 800 includes one or more processors (also called central processing units, or CPUs), such as processor 810. Processor 800 is connected to communication bus 820. Computer 800 also includes a main or primary memory 830, preferably random access memory (RAM). Primary memory 830 has stored therein control logic (computer software), and data.

Computer 800 may also include one or more secondary storage devices 840. Secondary storage devices 840 include, for example, hard disk drive 850 and/or removable storage device or drive 860. Removable storage drive 860 represents a floppy disk drive, a magnetic tape drive, a compact disk drive, an optical storage device, tape backup, ZIP drive, JAZ drive, etc.

Removable storage drive 860 interacts with removable storage unit 870. As will be appreciated, removable storage unit 860 includes a computer usable or readable storage medium having stored therein computer software (control logic) and/or data. Removable storage drive 860 reads from and/or writes to the removable storage unit 870 in a well known manner.

Removable storage unit 870, also called a program storage device or a computer program product, represents a floppy disk, magnetic tape, compact disk (CD-ROM), DVDs, magnetic tape, optical data storage devices, optical storage disk, or any other computer data storage device. Program storage devices or computer program products also include any device in which computer programs can be stored, such as read-only memory (ROM), random-access memory (RAM), hard drives, ROM, or memory cards, etc.

In an embodiment of the present invention is directed to computer program products or program storage devices having software that enables computer 800, or multiple computer 800s to perform any combination of the functions described herein.

Computer programs (also called computer program code, computer software code, or computer control logic) are stored in main memory 830 and/or the secondary storage devices 840. Such computer programs, when executed, direct computer 800 to perform the functions of embodiments of the present invention as discussed herein. In particular, the computer programs, when executed, enable processor 810 to perform the functions of embodiments of the present invention. Accordingly, such computer programs represent controllers of the computer 800.

Computer 800 also includes input/output/display devices 880, such as monitors, keyboards, pointing devices, etc.

Computer 800 further includes a communication or network interface 890. Network interface 890 enables computer 800 to communicate with remote devices. For example, network interface 890 allows computer 800 to communicate over communication networks, such as LANs, WANs, the Internet, etc. Network interface 890 may interface with remote sites or networks via wired or wireless connections. Computer 800 receives data and/or computer programs via network interface 890. The electrical/magnetic signals having contained therein data and/or computer programs received or transmitted by the computer 800 via interface 890 also represent computer program product(s).

The invention can work with communications protocols, software, hardware, and operating system implementations other than those described herein. Any communications protocols, software, hardware, and operating system implementations suitable for performing the functions described herein can be used.

4.0 Conclusion

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

Embodiments of present invention have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. Thus, the breadth and scope of the present invention should not be limited by any of the above-described exemplary embodiments, but should be defined only in accordance with the following claims and their equivalents.

What is claimed is:

1. A method of load balancing among a plurality of access control servers within a network, comprising:
   (a) receiving a request from a client for an access control server assignment;

(b) determining if the client is currently assigned to one of a plurality of access control servers;

(c) in response to determining that the client is not currently assigned to the one of the access control servers, identifying an available access control server based on a server load, wherein the server load is derived from one or more application load and machine capacity metrics as reported by the available access control server;

(d) assigning the client to the available access control server identified in step (c) to form an assignment between the client and the available access control server; and (e) communicating the assignment to the client via an authentication, authorization, and accounting (AAA) communications protocol, wherein the communicating includes:

communicating to the client the assignment in Diameter Attribute Value Pairs (AVPs) by:

setting a Result-Code attribute to a REDIRECT NOTIFICATION value indicating to the client that future commands should be redirected to the available access control server;

defining a scope of the redirect by setting a Redirect-Host-Usage attribute to an ALL HOST value;

setting a Redirect-Host attribute to the available access control server's IP address; and setting a Redirect-Max-Cache-Time attribute to the duration of the redirect in seconds.

2. The method of claim 1 further comprising referring to the assignment upon receipt of a subsequent request from the client.

3. The method of claim 1, wherein step (a) comprises receiving the request within a Diameter Capabilities-Exchange-Request message.

4. The method of claim 1, wherein step (c) comprises identifying as the available access control server one of the access control servers that includes bootstrap functionality.

5. The method of claim 1, wherein step (c) comprises identifying as the available access control server one of the access control servers that includes a least-loaded access control server.

6. The method of claim 4, wherein the server load is determined by a combination of the application load metrics including at least one of a size of internal message queues and a number and size of pending off-node transactions, and the machine capacity metrics including at least one of a number of current client assignments, cumulative capacity of assigned clients, central processing unit (CPU) utilization percentages, memory utilization percentage, storage usage percentage, disk activity, and input/output (I/O) throughput.

7. The method of claim 1, wherein the request is a Capabilities-Exchange-Request received at one or more bootstrap servers on startup of the client.

8. The method of claim 1, wherein step (b) comprises:

broadcasting a message to the access control servers wherein the message includes identification of the client requesting the access control server assignment and current client assignments for the access control servers;

receiving responses from the access control servers wherein the responses contain at least information indicating whether the client is currently assigned to the one of the access control servers.

9. The method of claim 1, wherein step (e) further comprises:

sending a Capabilities-Exchange-Request with at least a confirmation request from the client to the available access control server to which the client is assigned; and sending a Capabilities-Exchange-Response from the available access control server to which the client is assigned to the client with at least an acknowledgment message from the available access control server to which the client is assigned.

10. The method of claim 1, wherein step (c) comprises:

receiving current load and capacity data from the access control servers; and choosing the available access control server to host the client based upon the server load.

11. The method of claim 1 further comprising:

sending a Capabilities-Exchange-Response from the available access control server to which the client is assigned to a bootstrap server;

responding to the client from the bootstrap server wherein the response includes base protocol routing AVPs including at least the available access control server's IP address in a payload value of the Redirect-Host attribute; and sending another request from the client to the available access control server to which the client is assigned; and caching a redirect decision.

12. The method of claim 11, wherein caching the redirect decision further comprises: caching the redirect decision for a predetermined period of time.

13. The method of claim 12, further comprising deleting the redirect decision if the available access control server to which the client is assigned becomes unreachable.

14. The method of claim 11, wherein the bootstrap server caches the redirect decision for a Redirect-Max-Cache-Time period exceeding a response timeout of the client.

15. The method of claim 1, further comprising repeating steps (b)-(e) when the client is unable to contact the available access control server to which the client is assigned within a response timeout period of the client.

16. The method of claim 15, wherein a bootstrap server notifies an originally assigned server of the assignment of the client to the available access control server to avoid the originally assigned server claiming the client on future client reboots.

17. A method for dynamically load balancing access control servers within a network, the method comprising:

(a) storing historical access control server load patterns at a bootstrap server;

(b) reassigning clients based on peak usage periods in a given area;

(c) receiving periodic updates of access control server load information;

(d) determining which access control servers are overloaded, wherein a server load is derived from one or more application load and machine capacity metrics as reported by the access control servers; and (e) reassigning the clients from a subset of the access control servers that are overloaded to another subset of the access control servers that are less-loaded based on the server load, wherein the reassigning comprises sending one or more messages to each of the clients that have been reassigned with at least an indication that future commands should be sent to one of the access control servers that are less-loaded, the one or more messages including at least an address of a current access control server assignment, an indication of a scope of a redirect to the current access control server assignment, a setting to a redirect attribute to the one of the access control servers that is less-loaded and a second setting to a duration of the redirect.

18. The method of claim 17, wherein step (c) comprises polling the access control servers at timed intervals to request the application load metrics including a size of internal message queues and a number and size of pending off-node transactions, and the machine capacity metrics including a number of current client assignments, cumulative capacity of assigned clients, central processing unit (CPU) utilization percentages, memory utilization percentage, storage usage percentage, disk activity, and input/output (I/O) throughput.

19. The method of claim 18, wherein the timed intervals are configured to vary among the access control servers, based on one or more of server capacity, server usage profile, and server hardware configuration.

20. The method of claim 17 wherein receiving periodic updates of the server load comprises receiving messages containing current load and assigned client information from the control access servers at the bootstrap server at regular intervals.

21. A system for balancing access control server loads in a communications network, comprising:
   a bootstrap server having a central processing unit (CPU) configured to:
   receive requests from clients for server assignment;
   identify current server assignments for the clients;
   identify an available server based on a server load;
   assign one of the clients to the available server based on the server load to form an assignment between the client and the available server;
   inform the one of the clients of the assignment by sending one or more messages to the one of the clients with at least an indication that future commands should be sent to the available server including at least an address of a current server assignment, an indication of a scope of a redirect to the current server assignment, a setting to a redirect attribute to the available server's IP address and a second setting to a duration of the redirect; and
   store the current server assignments.

22. The system of claim 21, wherein the wherein the server identification module is configured to identify server load, wherein server load is derived from one or more application load and machine capacity metrics as reported by the server.

* * * * *